United States Patent [19]
Plyler et al.

[11] Patent Number: 5,884,661
[45] Date of Patent: Mar. 23, 1999

[54] SWIVELING FLUID CONNECTOR

[75] Inventors: Phillip B. Plyler, Atlanta; Andrew J. Cisternino, Marietta, both of Ga.

[73] Assignee: Hill-Rom Medaes, Inc., Norcross, Ga.

[21] Appl. No.: 671,600

[22] Filed: Jun. 28, 1996

[51] Int. Cl.[6] .................................................. E03B 1/00
[52] U.S. Cl. ...................... 137/616.5; 137/360; 137/580; 128/204.18
[58] Field of Search ................................... 137/360, 616, 137/616.5, 580; 128/204.18

[56] References Cited

U.S. PATENT DOCUMENTS

| | | | |
|---|---|---|---|
| 690,098 | 12/1901 | Champ | 137/616.5 |
| 691,747 | 1/1902 | Champ | 137/616.5 |
| 3,198,210 | 8/1965 | Lewis | 137/616.5 |
| 5,247,962 | 9/1993 | Walker | 137/360 |
| 5,492,148 | 2/1996 | Goughneour et al. | 137/616.5 |

FOREIGN PATENT DOCUMENTS

| | | | |
|---|---|---|---|
| 1059860 | 3/1954 | France | 137/616.5 |
| 595478 | 4/1934 | Germany | 128/204.18 |

OTHER PUBLICATIONS

"Gallery™ Wall By Ohmeda," Brochure, 1993 The BOC Group Inc, M051/1994.

*Primary Examiner*—A. Michael Chambers
*Attorney, Agent, or Firm*—Barnes & Thornburg

[57] ABSTRACT

A swiveling fluid connector includes a flexible fluid conduit connected to a check valve mounted for rotation. The flexible fluid conduit is connected between the check valve and a stationary fluid conduit. The check valve is mounted for rotating considerably with respect to the stationary fluid conduit. The flexible fluid conduit flexes to allow for rotation of the check valve relative to the stationary fluid conduit, and maintains leak-tight communication between the check valve and the stationary fluid conduit. The check valve extends through an aperture in a plate mounted in a gas services unit. Flanges on opposite ends of the check valve cooperate with the opposite surfaces of the plate to retain the check valve in the aperture, yet allow rotation of the check valve. The rotation of the check valve is limited to an acceptable range by the cooperation between protrusions and stops. The protrusions are connected to and travel with the check valve. The stops restrict travel of the protrusions, and therefore rotation of the check valve. The outlet of the check valve is preferably connected to a fluid conduit assembly having a spring-loaded base that expands to fix the fluid conduit assembly between the bottom of the check valve and a bottom shelf of the gas services unit. The expansion also fluidly connects the fluid conduit assembly to the check valve. A gas service device is connected to the fluid conduit assembly. The swiveling fluid connector allows the gas service device to be rotated. The swiveling fluid connector is constructed and arranged in a manner seeks to preclude any leakage from the gas services unit, even after numerous pivoting cycles.

20 Claims, 3 Drawing Sheets

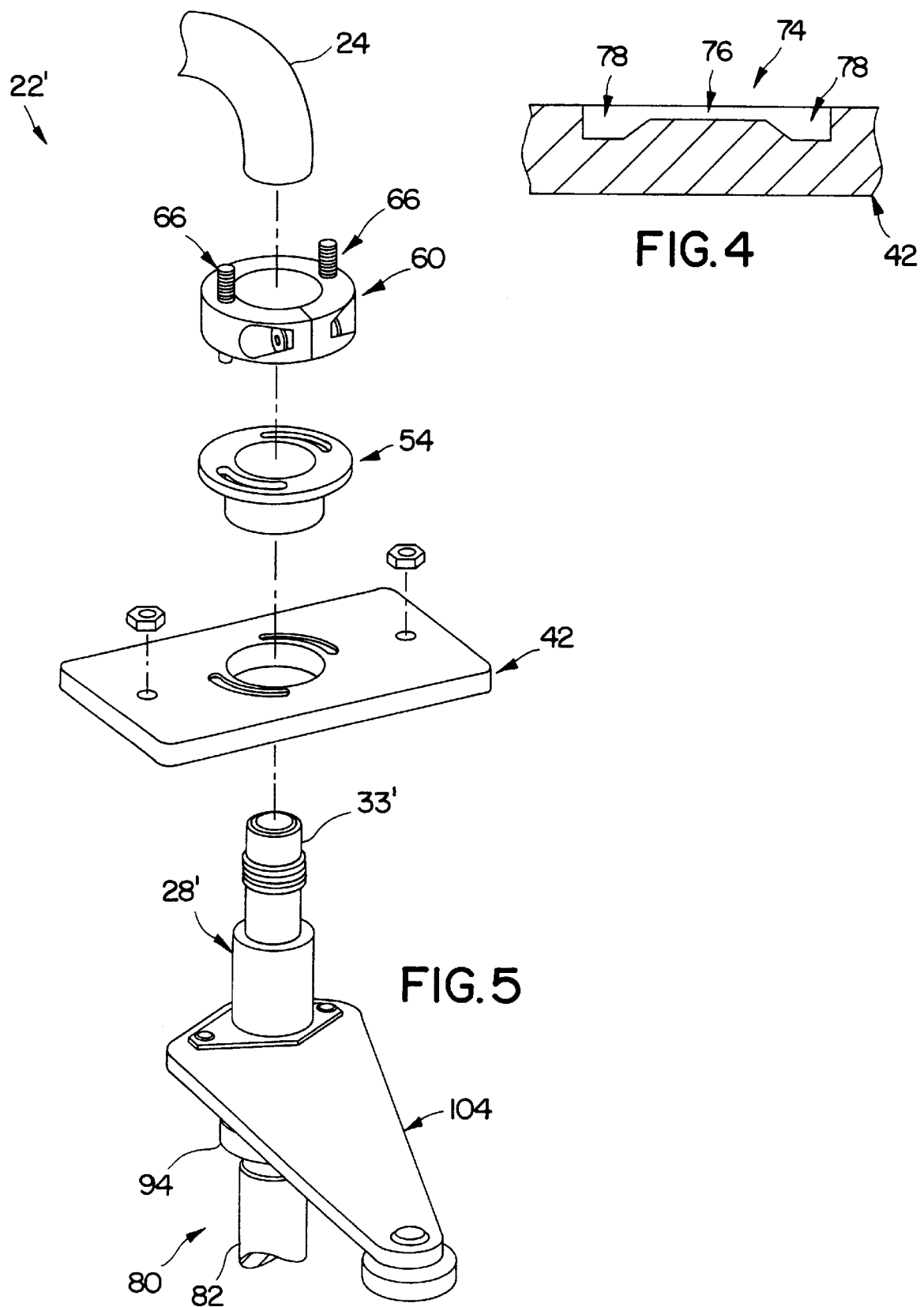

SWIVELING FLUID CONNECTOR

FIELD OF THE INVENTION

This invention relates generally to the field of gas services units and more particularly to swiveling fluid connectors used in gas services units.

BACKGROUND OF THE INVENTION

Gas services units are well known. For example, U.S. Pat. No. 5,247,962 discloses a prior art gas services unit. Gas services units typically provide gas related services, such as compressed air, oxygen and vacuum, to rooms in health care facilities. A gas services unit typically includes an outer shell or housing that is secured into a recess in a wall. Gas service devices, such as gas flow meters and vacuum control boxes, are housed within the shell of a gas services unit. The gas service devices are in fluid communication with remotely located gas and vacuum reserves by way of fluid conduits. A gas services unit may also include a cover, such as a picture or the like, that can be moved to alternately cover and provide access to the gas service devices therein. It is believed that by covering the gas service devices, a room in a heath care facility appears more comfortable to patients.

With conventional wall construction, the depth of the recesses that receive gas services units is limited. Therefore, a gas service device must be rotated out of its gas services unit when in use, and rotated into the gas services unit when not in use so that it can be covered. The rotating is typically facilitated by swiveling fluid connectors. An example of a prior art swiveling fluid connector is disclosed in U.S. Pat. No. 5,247,962.

It is extremely important that swiveling fluid connectors in gas services units not leak, even after many pivot cycles. For example, oxygen leaking from a swiveling fluid connector in a gas services unit is a fire hazard. It is believed that prior swiveling fluid connectors might be susceptible to leakage after many pivot cycles. Further, prior swiveling fluid connectors must be disassembled to inspect components thereof that are critical to leak-tightness.

Thus, a need exists for new and improved swiveling fluid connectors of the type acceptable for use in gas services units.

SUMMARY OF THE INVENTION

Briefly described, the present invention includes an improved swiveling fluid connector. The improved swiveling fluid connector preferably includes a pivotally mounted fluid conduit and a flexible fluid conduit. One end of the flexible fluid conduit is connected to and communicates with the pivotally mounted fluid conduit. The opposite end of the flexible fluid conduit is connected to and communicates with a stationary fluid conduit (i.e., stationary relative to a frame of reference). The pivotally mounted fluid conduit is mounted for rotating relative to the stationary fluid conduit. The flexible fluid conduit flexes to facilitate the relative rotation and maintain leak-tight communication between the pivotally mounted fluid conduit and the stationary fluid conduit. Additionally, the flexible fluid conduit can be readily inspected without disassembling the improved swiveling fluid connector.

In accordance with the preferred embodiment of the present invention, the pivotally mounted fluid conduit is a check valve incorporated into a gas services unit, and the stationary fluid conduit communicates with a gas supply (e.g., a remotely located gas or vacuum reserve). The check valve extends through an aperture in a plate. Flanges on opposite ends of the check valve cooperate with the opposite surfaces of the plate to retain the check valve in the aperture, yet allow rotation of the check valve. The rotation of the check valve is limited to an acceptable range by the interaction between protrusions and stops. The protrusions are connected to and travel with the check valve. The stops restrict the travel of the protrusions and therefore the rotation of the check valve.

In accordance with the preferred embodiment of the present invention, the end of the check valve that is opposite from the flexible fluid conduit is connected to a spring-loaded fluid conduit assembly that rotates with the check valve. The spring-loaded fluid conduit assembly expands to become movably fixed between the bottom of the check valve and a bottom shelf of the gas services unit. The expansion also serves, in part, to fluidly connect the spring-loaded fluid conduit assembly to the check valve. A gas service device, such as a flow meter or vacuum controlling device, is fluidly connected to the spring-loaded fluid conduit assembly. The gas services device rotates with the check valve and the spring-loaded fluid conduit assembly. That is, the swiveling fluid connector of the present invention allows the gas service device to be readily rotated into and out of the shell of the gas services unit. The flexible fluid conduit flexes to allow the gas service device, spring-loaded fluid conduit assembly, and check valve to all pivot together relative to the stationary fluid conduit. The swiveling fluid connector of the present invention is constructed and arranged in a manner seeks to preclude any leakage from the gas services unit, even after numerous pivoting cycles.

Thus, it is an object of the present invention to provide a swiveling fluid connector that can be cycled many times without jeopardizing its leak-tightness.

It is a further object of the present invention to prevent leakage of gas or vacuum in medical facilities.

It is a further object of the present invention to prevent fire hazards in medical facilities.

It is a further object of the present invention to provide a swiveling fluid connector whose integrity is susceptible to easy inspection and maintenance.

It is a further object of the present invention to promote the utilization of inconspicuous gas services units by providing an improved component therefore.

It is a further object of the present invention to promote patient comfort by promoting the advancement of gas services units.

Other objects, features and advantages of the present invention will become apparent upon reading and understanding this specification taken in conjunction with the accompanying drawings.

BRIEF DESCRIPTION OF THE DRAWINGS

FIG. 4 is an isolated, cross-sectional view of portions of a plate of the swiveling fluid connector of FIG. 3, taken along line 4—4 of FIG. 3.

FIG. 5 is an exploded, partially cut-away, perspective view of select portions of a gas services unit in accordance with an alternate embodiment of the present invention.

DETAILED DESCRIPTION OF THE PREFERRED EMBODIMENTS

Figure 1:
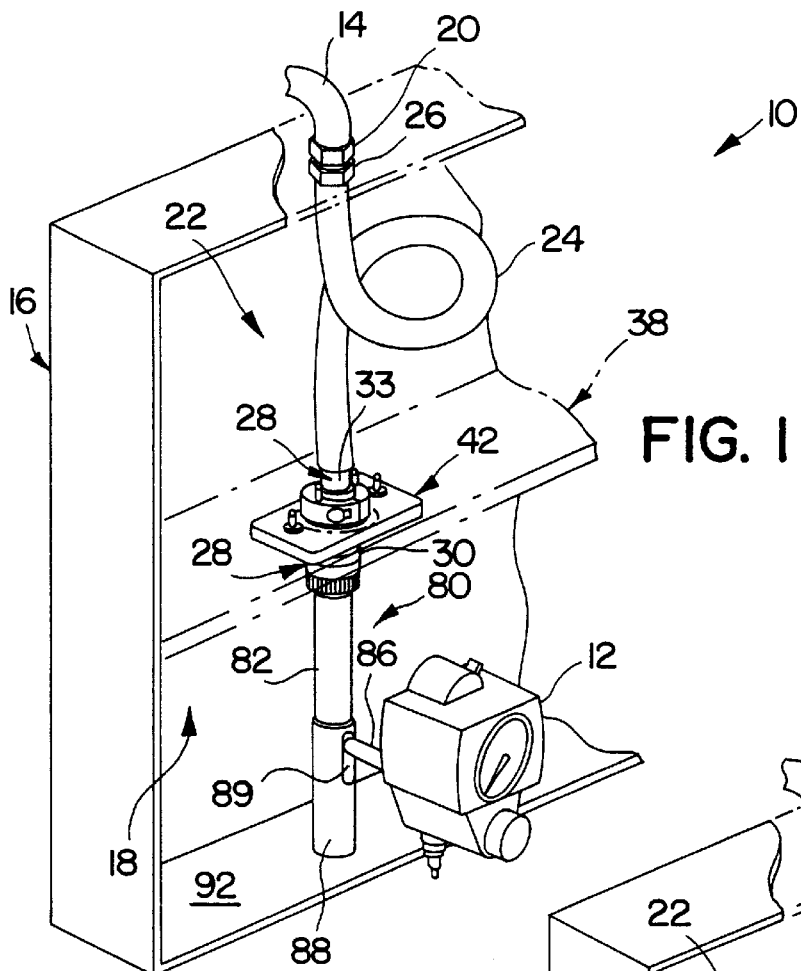
FIG. 1 is a perspective, partially cut-away view of a gas services unit with a gas service device rotated to a first position, in accordance with a preferred embodiment of the present invention.
Figure 2:
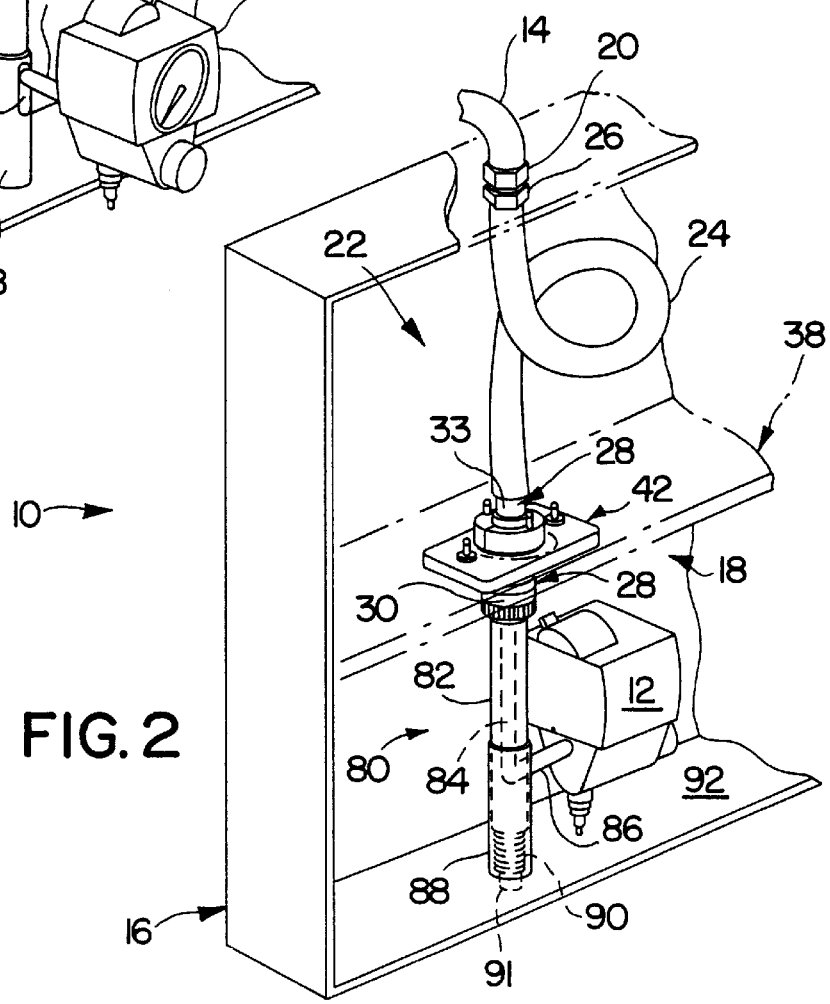
FIG. 2 is a perspective, partially cut-away view of the gas services unit of FIG. 1, wherein the gas service device is rotated to a second position, in accordance with the preferred embodiment of the present invention.

Referring now to the drawings, in which like numerals refer to like parts through out the several views, FIGS. 1 and 2 depict a gas services unit 10 housing a gas service device 12, in accordance with a preferred embodiment of the present invention. The depicted gas services unit 10 includes a shell 16 that preferably fits into a recess in the wall of medical facility. The shell 16 is partially cut-away in FIGS. 1 and 2. The shell 16 includes various panels that at least partially bound and define a recess 18 for receiving the gas service device 12. In FIG. 1, the gas service device 12 is rotated to a first position. In the first position, the gas service device 12 extends from the recess 18 and is accessible for use. In FIG. 2, the gas service device 12 is rotated to a second position. In the second position, the gas service device 12 is disposed within the recess 18 such that the recess 18 can be readily concealed with a cover (not shown), such as a picture or the like. The term gas service device 12 is intended to include, but is not limited to, devices for dispensing or otherwise using medical gases supplied by the gas services unit 10. For example, gas service devices 12 include flow meters, vacuum controlling devices, and the like. As used herein, the term "gas" or "medical gas" refers to compressed air, oxygen and vacuum, as well as any other gaseous substances or services that may be used in a medical facility.

Referring to FIG. 1, the gas services unit 10 is fluidly connected to a gas supply conduit 14. While the gas supply conduit 14 is cut-away in FIG. 1, it should be understood that the gas supply conduit 14 extends to a gas supply (not shown) such as a gas or vacuum reserve/tank, or the like. The gas supply conduit 14 preferably extends from the gas supply to the shell 16 and terminates at a fitting 20. The fitting 20 is preferably mounted to the shell 16 or disposed within the recess 18. The gas supply conduit 14 is stationary with respect to a frame of reference. A swiveling fluid connector 22 provides leak-tight fluid communication between the gas service device 12 and the gas supply conduit 14. The swiveling fluid connector 22 further facilitates the pivoting of the gas service 12 relative to the shelf 16 and the gas supply conduit 14. As discussed in greater detail below, a spring-loaded fluid conduit assembly 80 is fluidly connected between the swiveling fluid connector 22 and the gas service device 12. While only one assembly that includes a gas supply conduit 14, swiveling fluid connector 22, fluid conduit assembly 80 and gas service device 12 is depicted in FIGS. 1 and 2, preferably a plurality of those assemblies are similarly housed within a single shell 16.

Figure 3:
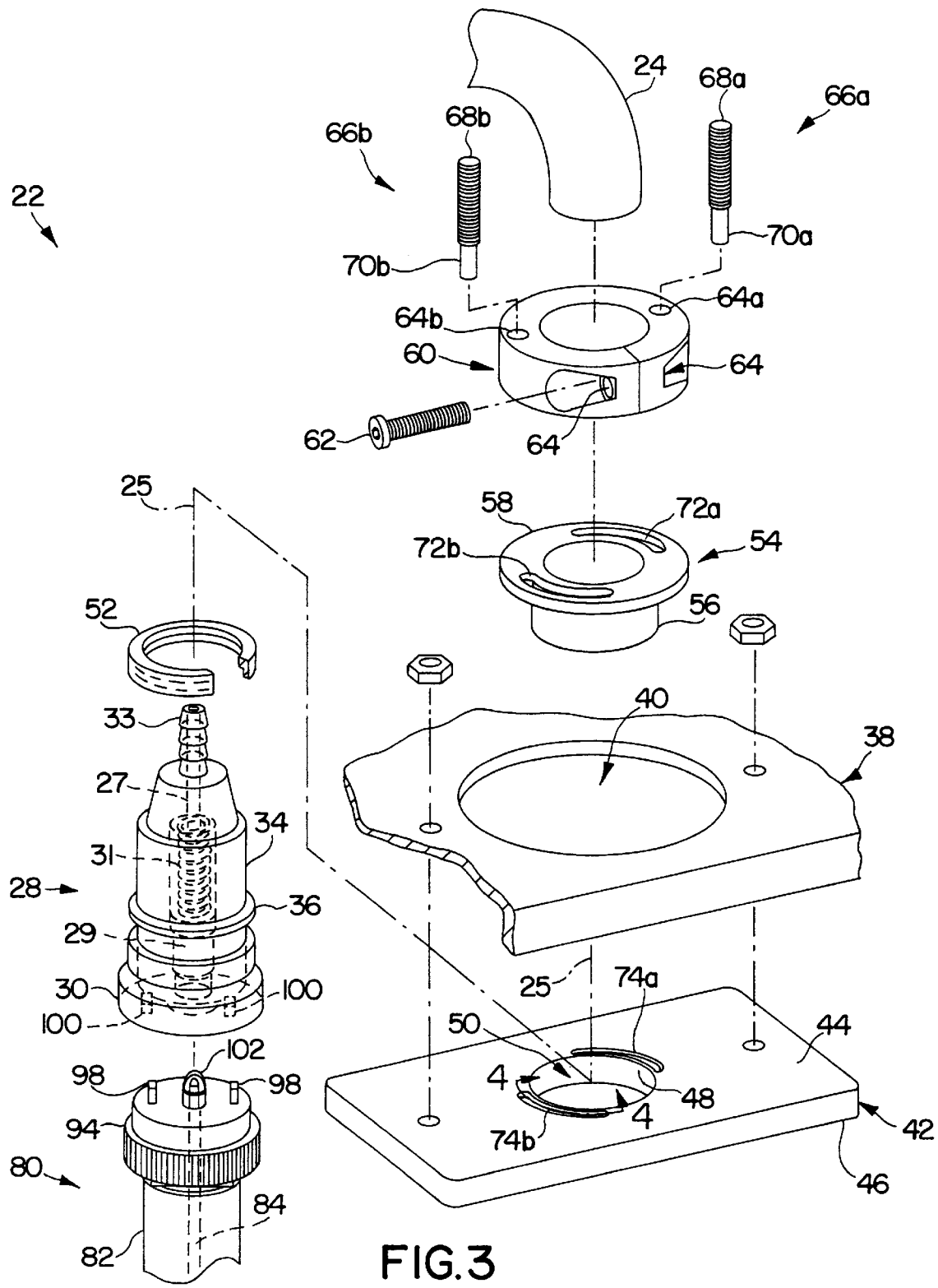
FIG. 3 is an exploded, partially cut-away, perspective view of a swiveling fluid connector portion, and other select portions, of the gas services unit of FIG. 1.

FIG. 3 is an exploded, partially cut-away, perspective view of the swiveling fluid connector 22 and other select portions of the gas services unit 10. Referring to FIGS. 1–3, the swiveling fluid connector 22 includes a flexible fluid conduit 24. As depicted in FIG. 1, the flexible fluid conduit 24 is preferably a single elongated tube that has been overlapped to form a loop intermediate of its ends. Further, one end of the flexible fluid conduit 24 is fluidly connected to the gas supply conduit 14 by fittings 20,26. The opposite end of the flexible fluid conduit 24 is connected to an end of a pivotally mounted fluid conduit 28. In accordance with the preferred embodiment of the present invention, the fluid conduit 28 is in the form of a pivotally mounted check valve assembly 28. The spring-loaded fluid conduit assembly 80 and gas service device 12 are connected to and pivot with the check valve assembly 28. Referring to FIG. 3, the check valve assembly 28 defines an elongated axis 25, which is collinear with the axis of rotation of the check valve assembly 28. The check valve assembly 28 defines an internal valve passage 27 that is depicted by broken lines in FIG. 3. The valve passage 27 extends between opposite ends of the check valve assembly 28. The valve passage 27 is open at the end of a barbed connector 33 portion of the check valve assembly 28, and is selectively open at a female conduit adapter 30 portion of the check valve assembly 28, as discussed in greater detail below. As also depicted by broken lines in FIG. 3, the check valve assembly 28 includes a valve plug 29 and a spring 31 that are within the valve passage 27. The value plug 29 is biased by the spring 31 to a closed configuration. In the closed configuration, the valve plug 29 is proximate to the female conduit adapter 30 and obstructs the valve passage 27. The valve plug 29 is capable of being urged to an open configuration. In the open configuration, the spring 31 is compressed so that the valve plug 29 is moved toward the barbed connector 33 and ceases to obstruct the valve passage 27.

The check valve assembly 28 is mounted to and rotations relative to the shell 16. Referring primarily to FIG. 3, the shell 16 includes a member 38 that is in the form of a shelf 38 and defines a shelf aperture 40 therethrough. The shelf 38 is partially cut-away in FIG. 3 and shown in broken lines in FIGS. 1 and 2. The swiveling fluid connector 22 further includes a mounting plate 42. The mounting plate 42 includes an annular surface 48 that encircles and defines a plate aperture 50. The shelf aperture 40 is preferably larger than the plate aperture 50. The mounting plate 42 is mounted to the bottom of the shelf 38 such that the apertures 40,50 are generally aligned. The mounting plate 42 is immovably mounted to the shelf 38 with screws and nuts, or the like. The check valve assembly 28 extends through the apertures 40,50 and pivots relative to the shelf 30 and mounting plate 42. A lower annular flange 36 and an upper annular flange 60 are associated with the check valve assembly 28 and cooperate with a lower surface 46 and upper surface 44 of the plate 42 to maintain the check valve assembly 28 within the apertures 40,50.

The check valve assembly 28 defines a cylindrical valve outer surface 34. The lower annular flange 36 encircles and extends radially away from the valve outer surface 34. The lower annular flange 36 is integral to and rotates with the check valve assembly 28 relative to the mounting plate 42. Regarding the manufacture/assembly of the swiveling fluid connector 22, an annular lower bearing collar 52 is fit over the cylindrical valve outer surface 34 and covers the lower annular flange 36. The lower bearing collar 52 is partially cut-away in FIG. 3 to disclose its shape. The barbed connector 33 is passed through the apertures 40,50, so that the lower bearing collar 52 is sandwiched between the lower annular flange 36 and the lower surface 46 of the mounting plate 42. The lower bearing collar 52 reduces the frictional interaction between the lower annular flange 36 and the lower surface 46 of the mounting plate 42. The lower bearing collar 52 and lower annular flange 36 cooperate with the bottom surface 46 of the mounting plate 42 to preclude passage of the check valve assembly 28 upward through the apertures 40,50.

The upper annular flange 60 is preferably in the form of a clamp 60 that is clamped to that portion of the valve outer surface 34 that is disposed above the mounting plate 42 after the check valve assembly 28 has been partially passed through the apertures 40,50. After the clamp 60 is applied, the end of the flexible fluid conduit 24 that is opposite from the fittings 20,26 (FIGS. 1 and 2) is securely fit to the barbed connector 33 so that it does not move relative to the barbed connector 33. Before the clamp 60 is applied to the check valve assembly 28, an upper bearing collar 54 that cooperates with the clamp 60 is attached to the mounting plate 42. The upper bearing collar 54 includes an annular skirt portion 56 that depends from the inner annular edge of a washer portion 58. The skirt portion 56 fits into the plate aperture 50 such that it is interposed between the annular surface 48 of the mounting plate 42 and the valve outer surface 34. The skirt portion 56 reduces the frictional interaction between the annular surface 48 of the mounting plate 42 and the valve outer surface 34. The washer portion 58 of the upper bearing collar 54 covers the portion of the upper surface 44 of the mounting plate 42 that encircles the plate aperture 50.

The clamp 60 is connected to the valve outer surface 34 such that the clamp 60 and check valve assembly 28 rotate in unison relative to the mounting plate 42. The clamp 60 is somewhat c-shaped. A bolt 62 or the like is threaded through threaded apertures 64 defined through opposite portions of the clamp 60 to fasten the clamp 60 to the check valve assembly 28. The clamp 60 is fastened to the check valve assembly 28 above the upper bearing collar 54 such that the washer portion 58 of the upper bearing collar 54 is sandwiched between the bottom surface of the clamp 60 and the portion of the upper surface 44 of the mounting plate 42 that encircles the shelf aperture 40. The washer portion 58 reduces friction between the clamp 60 and the mounting plate 42.

The clamp 60 defines two threaded apertures 64a,b, that extend through the clamp 60, from top to bottom. The threaded apertures 64a,b receive plunger assemblies 66a,b, respectively. Each plunger assembly 66 includes a threaded outer cylinder 68 having a bore (not shown) therethrough. Protrusions 70a,b, in the form of rods with rounded lower ends, extend out of the bottoms of the bores. The protrusions 70a,b are biased downward by springs (not shown) internal to the bores. Screws (not shown) are threaded into the top ends of the bores in the outer cylinders 68 to adjust the spring force applied to the protrusions 70. The spring force is preferably in the range of three to thirteen pounds. The plunger assemblies 66 are threaded into the threaded apertures 64 so that the protrusions 70 are biased downward from the bottom surface of the clamp 60. The washer portion 58 of the upper bearing collar 54 defines arcuate apertures 72a,b, that the protrusions 70a,b extend through, respectively. The upper surface 44 of the mounting plate 42 defines two arcuate channels 74a,b that the protrusions 70a,b, respectively, extend into. Travel of the protrusions 70a,b is limited to the arcuate channels 74a,b, respectively. Accordingly, rotation of the clamp 60 relative to the mounting plate 42 and the shelf 38 is limited. Because the clamp 60 is immovably connected to the check valve assembly 28, rotation of the check valve 28 relative to the mounting plate 42 and the shelf 38 is limited by the cooperation between the plunger assemblies 66 and the arcuate channels 74. The arcuate channels 74a,b are diametrically opposed from one another. The plunger assemblies 66a,b are similarly diametrically opposed from one another. Each of the arcuate channels 74 extend approximately ninety degrees about the vertical axis 25 extending through the plate aperture 50. Therefore, the gas service device 12 pivots approximately 90 degrees between first configuration depicted in FIG. 1 and the second configuration depicted in FIG. 2, and the pivoting of the gas service device 12 is limited to that approximately 90 degrees.

FIG. 4 is an isolated cross-sectional view of a portion of the mounting plate 42 taken along line 4—4 of FIG. 3. FIG. 4 shows the contours of the arcuate channel 74b (FIG. 3), which are representative of the contours of the arcuate channel 74a (FIG. 3). Each arcuate channel 74 defines a shallow intermediate portion 76 and deeper portions 78 at the opposite ends of the arcuate channel 74. The protrusions 70 (FIG. 3) are always in contact with the bottom of their respective arcuate channel 74. When the gas service device 12 is in the first position depicted in FIG. 1, the protrusions 70 reside in one pair of deeper portions 78, wherein one of those deeper portions 78 is in the arcuate channel 74a and the other of those deeper portions 78 is in the arcuate channel 74b. When the gas service device 12 is in the second position depicted in FIG. 2, the protrusions 70 reside within the opposite pair of deeper portions 78. Due to the fact that the protrusions 70 are biased downward, once the protrusions 70 reside in deeper portions 78, the plunger assemblies 66 cooperate with the arcuate channels 74 in a manner that temporarily "locks" the check valve assembly 28 (FIGS. 1–3), the fluid conduit assembly 80 (FIGS. 1 and 2) and the gas service device 12 (FIGS. 1 and 2) in place.

Referring back to FIG. 2, in accordance with the preferred embodiment of the present invention, the spring-loaded fluid conduit assembly 80 is selectively connected between the bottom end of the check valve assembly 28 and the gas service device 12 such that the check valve assembly 28 and gas service device 12 fluidly communicate through the conduit assembly 80. The conduit assembly 80 includes a fluid conduit 82 that defines an internal L-shaped passage 84 that is depicted in broken lines in FIG. 2. When the conduit assembly 80 is configured as depicted in FIGS. 1 and 2, one end of the L-shaped passage 84 is in communication with the valve passage 27 (FIG. 3), and the opposite end of the L-shaped passage fluidly communicates through a fluid conduit or elongated nipple 86 with the gas service device 12. Referring to FIGS. 1 and 2, the conduit assembly 80 further includes a sleeve 88 that is open at the top and closed at the bottom. The nipple 86 extends through a side aperture 89 (FIG. 1) defined through the sleeve. The bottom of the lower fluid conduit 82 extends through the upper opening of the sleeve 88. A spring 90, depicted by broken lines in FIG. 2, is internal to the sleeve 88 and is interposed between and biases apart the bottom of the sleeve 88 and the bottom of the lower fluid conduit 82. The spring 90 is manually compressed so that the conduit assembly 80 can be properly inserted into the recess 18 defined by the shell 16. Then, a protrusion 91 (FIG. 2), shown in broken lines and defined at the bottom of the sleeve 88, is aligned with an aperture defined in a bottom panel 92 of the shell 16, and the top of the conduit assembly 80 is aligned with the bottom of the check valve assembly 28, as depicted in FIGS. 1 and 2. The spring 90 is then allowed to expand so that the spring 90 forces the sleeve 88 and the lower fluid conduit 82 apart. This wedges the conduit assembly 80 between the bottom panel 92 of the shell 16 and the bottom of the check valve assembly 28.

With reference to FIG. 3, when the conduit assembly 80 is properly wedged between the bottom panel 92 and the bottom of the check valve assembly 28, as depicted in FIGS. 1 and 2, the female conduit adapter 30 of the check valve assembly 28 cooperates with a male conduit adapter 94 at the upper end of the conduit assembly 80. In accordance with the preferred embodiment of the present invention, the conduit adapters 30,94 are keyed by virtue of the fact that protrusions 98 must properly align with indentions 100 in order for a proper connection to be facilitated between the conduit adapters 30,94. When proper connection occurs, a post 102 on the male conduit adapter 94 protrudes through the female conduit adapter 30 into the valve passage 27 to move the valve plug 29 so that it unobstructs the valve passage 27. This establishes fluid communication between the valve passage 27 and the L-shaped passage 84 defined through the lower fluid conduit 82, whereby the gas service device 12 (FIGS. 1 and 2) is placed in fluid communication with the gas supply conduit 14 (FIG. 1).

FIG. 5 is an exploded perspective view of components of a swiveling fluid connector 22', and other select components, in accordance with an alternate embodiment of the present invention. Except for the specific differences noted, the swiveling fluid connector 22' of the alternate embodiment is identical to the swiveling fluid connector 22 (FIGS. 1–3) of the preferred embodiment. In the alternate embodiment, the lower annular flange 36 (FIG. 3) is replaced with a handle 104 and the lower bearing collar 52 (FIG. 3) is not employed. The handle 104 can be manipulated by a user to facilitate the pivoting of the swiveling fluid connector 22'. In the preferred embodiment pivoting is acceptably accomplished by using the gas service device 12 (FIGS. 1 and 2) as a handle. The barbed connector 33' is modified as shown in FIG. 5.

Referring back to FIGS. 1–3, in accordance with the preferred embodiment of the present invention, the flexible fluid conduit 34 is a unitary conduit. That is, the flexible fluid conduit 34 is preferably absent of separate but joinable parts. Further, the flexible fluid conduit 34 is preferably constructed and arranged so that it flexes when the check valve assembly 28 is rotated relative to the gas supply conduit 14. That is, a first segment of the flexible fluid conduit 34 moves substantially relative to a second segment of the flexible fluid conduit 34 when the check valve assembly 28 is rotated relative to the gas supply conduit 14. The flexible fluid conduit 34 is acceptably a piece of flexible rubber tubing such as that identified as Parker 5159 Electrically Conductive Hose, and available from the Hose Products Division of the Parker Hannifin Corporation, which is located in Wickliffe, Ohio. The bearing collars 52, 54 are preferably constructed of a durable plastic material such as that sold under the trademark of Delrin, or the like. Acceptable plunger assemblies 66 are referred to as Spring Plungers, part number SSS54N, available from VLIER of Brighton, Mass., which is a division of Barry Controls of Brighton, Mass., which is a division of APPLIED POWER of Milwaukee Wis. In light of this disclosure, one reasonably skilled in the art can readily make and use present invention. For example, the construction and arrangement of the components internal to the check valve assembly 28 (FIG. 3), the conduit adapters 30,94 (FIG. 3), and the spring-loaded conduit assembly 80 (FIGS. 1–3) are all well known and prior art with respect to the present invention.

While this invention has been described in detail with particular reference to the preferred embodiments thereof, it will be understood that variations and modifications can be made to these embodiments without departing from the spirit and scope of the invention as described herein and as defined in the appended claims.

We claim:

1. A gas services unit for housing a gas service device, and connecting to a gas supply, the gas services unit comprising:
    a shell for at least partially enclosing the gas service device and adapted to be received in the recess in the wall;
    a pivotally mounted fluid conduit mounted for pivoting relative to said shell and the gas supply; and
    a flexible fluid conduit including a first end for connecting to the gas supply and a second end connected to an opening of said pivotally mounted fluid conduit, said flexible fluid conduit constructed and arranged for
    providing substantially leak-tight communication between said pivotally mounted fluid conduit and the gas supply, and
    allowing said pivotally mounted fluid conduit to rotate relative to said shell and the gas supply.

2. The gas services unit of claim 1, wherein said flexible fluid conduit forms a loop between the gas supply and said pivotally mounted fluid conduit.

3. The gas services unit of claim 1, wherein said shell includes a shelf, said shelf defining an aperture therethrough, said pivotally mounted fluid conduit at least partially disposed within said aperture and connected to said shelf for rotation within said aperture.

4. The gas services unit of claim 1, wherein said flexible fluid conduit includes a first segment and a second segment, and is absent of separate but joinable parts, and wherein said flexible fluid conduit is constructed and arranged so that said second segment rotates substantially relative to said first segment during said rotation of said pivotally mounted fluid conduit.

5. The gas services unit of claim 1, wherein said gas services unit further comprises a valve plug at least partially disposed within said pivotally mounted fluid conduit, wherein said valve plug is biased toward a first position in which said valve plug substantially obstructs passage through said pivotally mounted fluid conduit, and wherein said valve plug is capable of being urged to a second position in which passage through said pivotally mounted fluid conduit is substantially unobstructed.

6. The gas services unit of claim 5,
    wherein said shell includes a bottom panel, and
    wherein the gas services unit further comprises a fluid conduit assembly cooperating between said bottom panel and an opening of said pivotally mounted fluid conduit, said fluid conduit assembly including a protrusion urging said valve plug to said second position so that said pivotally mounted fluid conduit and said fluid conduit assembly are in fluid communication.

7. The gas services unit of claim 1, further comprising a restriction means for allowing substantial rotation of said pivotally mounted fluid conduit yet limiting said rotation to less than 180 degrees, said restriction means comprising:
    a projection connected to and traveling with said pivotally mounted fluid conduit to define a path having opposite ends; and
    stops at said opposite ends of said path for limiting said travel of said projection and said rotation of said pivotally mounted fluid conduit.

8. The gas services unit of claim 7, further comprising a body, said body defining an aperture therethrough, said pivotally mounted fluid conduit at least partially disposed within said aperture and connected to said body for rotation within said aperture, wherein said path is in the form of an arcuate channel defined in said body, and said stops are defined as the opposite ends of said arcuate channel.

9. The gas services unit of claim 1, further comprising:
    a body defining an upper surfaces and an aperture, said pivotally mounted fluid conduit at least partially disposed within said aperture and connected to said body for rotation within said aperture; and
    a first flange connected to said pivotally mounted fluid conduit and cooperating with said upper surface to restrict the downward passage of said pivotally mounted fluid conduit through said aperture.

10. The gas services unit of claim 9 wherein said first flange is a collar removably clamped to said pivotally mounted fluid conduit;

wherein said body is a plate connected to said shell, said plate defining an arcuate channel having opposite ends; and wherein the gas services unit further comprises a projection connected to and traveling with said first collar, said projection extending into said arcuate channel and cooperating with said opposite ends of said arcuate channel to restrict rotation of said pivotally mounted fluid conduit.

11. The gas services unit of claim 9, further comprising a second flange connected to said pivotally mounted fluid conduit, wherein said body further includes a lower surface and said second flange cooperates with said lower surfaced to restrict the upward passage of said pivotally mounted fluid conduit through said aperture.

12. The gas services unit of claim 11, further comprising:

a first bearing collar interposed between said first flange and said body; and a second bearing collar interposed between said second flange and said body.

13. A swiveling fluid connector comprising:

a body;

a pivotally mounted fluid conduit connected to said body for rotation relative to said body and a frame of reference; and a flexible fluid conduit including a first end for staying generally fixed with respect to said frame of reference and a second end connected to and communicating through an opening of said pivotally mounted fluid conduit, said flexible fluid conduit constructed and arranged to maintain a substantially leak-tight connection between said pivotally mounted fluid conduit and said flexible fluid conduit while said second end moves substantially relative to said first end during said rotation of said flexible fluid conduit.

14. The swiveling fluid connector of claim 13, wherein said body defines a surface and an aperture, wherein said pivotally mounted fluid conduit extends at least partially into said aperture and is connected to said body for rotation within said aperture, and wherein the swiveling fluid connector further comprises a flange connected to said pivotally mounted fluid conduit and cooperating with said surface to restrict the passage of said pivotally mounted fluid conduit through said aperture.

15. The swiveling fluid connector of claim 13, further comprising a valve plug at least partially disposed within said pivotally mounted fluid conduit, wherein said valve plug is biased toward a first position in which said valve plug substantially obstructs passage through said pivotally mounted fluid conduit, and wherein said valve plug is capable of being urged to a second position in which passage through said pivotally mounted fluid conduit is substantially unobstructed.

16. The swiveling fluid connector of claim 13, wherein said body defines an arcuate channel having opposite ends, and wherein the swiveling fluid connector further comprises a projection connected to and traveling with said pivotally mounted fluid conduit, said projection extending into said arcuate channel and cooperating with said opposite ends of said arcuate channel to restrict rotation of said pivotally mounted fluid conduit.

17. A swiveling fluid connector comprising:

a stationary fluid conduit that is stationary with respect to a frame of reference;

a pivotally mounted fluid conduit mounted for rotation relative to said frame of reference;

a flexible fluid conduit including a first end connected to an opening of said stationary fluid conduit and a second end connected to an opening of said pivotally mounted fluid conduit, wherein said first end of said flexible fluid conduit remains stationary with respect to said frame of reference, wherein said second end of said flexible fluid conduit rotates relative to said frame of reference with said pivotally mounted fluid conduit, and wherein said flexible fluid conduit is constructed and arranged to flex and maintain a substantially leak-tight connection between said pivotally mounted fluid conduit and said stationary fluid conduit during said rotation of said pivotally mounted fluid conduit.

18. The swiveling fluid connector of claim 17, further comprising:

a body defining a surface and an aperture, wherein said pivotally mounted fluid conduit extends at least partially into said aperture and is connected to said body for rotation within said aperture; and a flange connected to said pivotally mounted fluid conduit and cooperating with said surface to restrict the passage of said pivotally mounted fluid conduit through said aperture.

19. The swiveling fluid connector of claim 17, further comprising a valve plug at least partially disposed within said pivotally mounted fluid conduit, wherein said valve plug is biased toward a first position in which said valve plug substantially obstructs passage through said pivotally mounted fluid conduit, and wherein said valve plug is capable of being urged to a second position in which passage through said pivotally mounted fluid conduit is substantially unobstructed.

20. The swiveling fluid connector of claim 17, further comprising:

a body defining an arcuate channel having opposite ends; and a projection connected to and traveling with said pivotally mounted fluid conduit, said projection extending into said arcuate channel and cooperating with said opposite ends of said arcuate channel to restrict rotation of said pivotally mounted fluid conduit.

* * * * *